Jan. 18, 1938.                D. R. STAMY                2,105,706
                              FASTENER
                          Filed Feb. 16, 1935
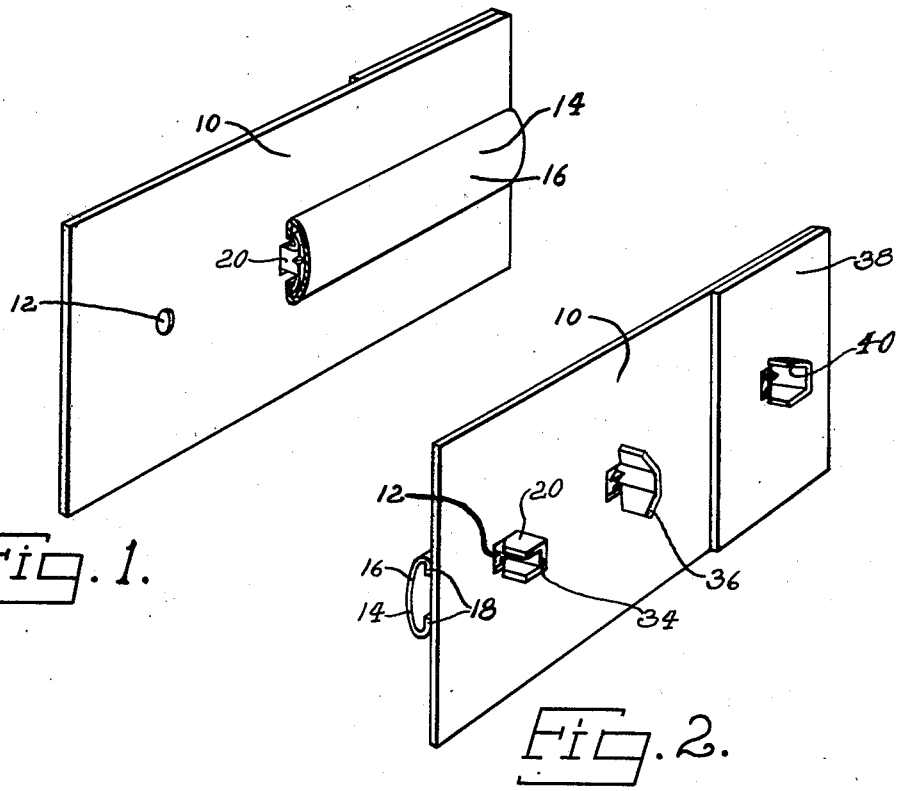
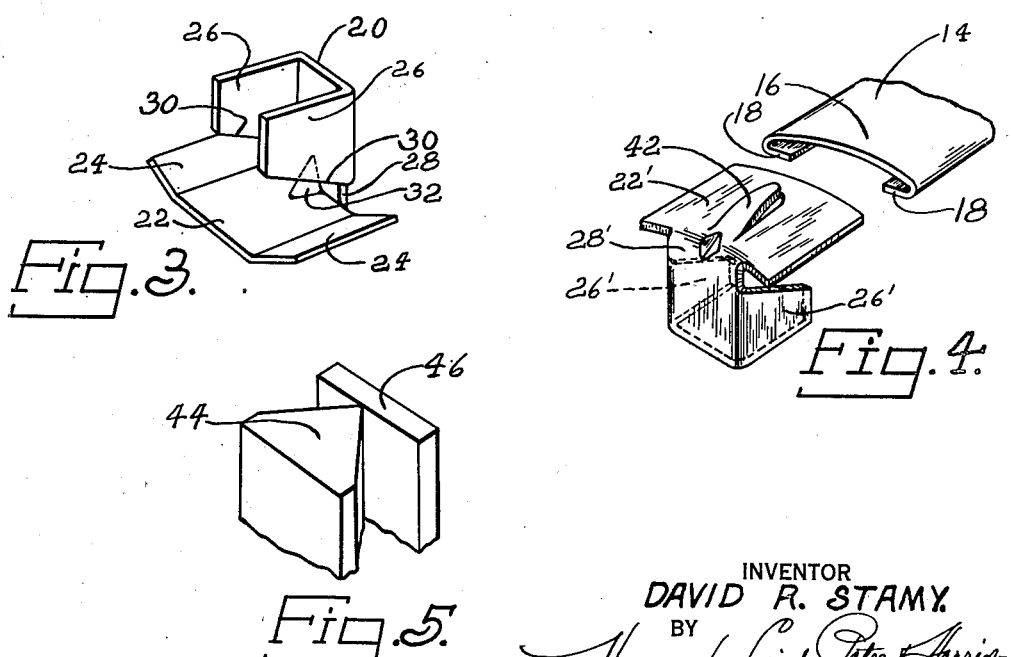
INVENTOR
DAVID R. STAMY.
BY
Harness, Dind, Patee Harris
ATTORNEYS.

Patented Jan. 18, 1938

2,105,706

UNITED STATES PATENT OFFICE 2,105,706

FASTENER

David R. Stamy, Huntington Woods, Mich., assignor to Chrysler Corporation, Detroit, Mich., a corporation of Delaware Application February 16, 1935, Serial No. 6,791

4 Claims. (Cl. 85—5)

This invention relates to an improved fastener.

More particularly the invention has to do with the securing of a decorative trim member, such as a moulding, to a support, and is illustrated in connection with the assembly of a moulding to a part of an automotive vehicle body, although it should be understood that the invention in its broader aspects is not to be so limited.

An object of the invention is to provide an improved fastener for securing a part to be supported to a support in order that such parts can be assembled with a minimum of effort by relatively unskilled labor.

Another object of the invention is to provide a fastener which is adapted for general application in connection with parts of diverse thicknesses.

A further object of the invention is to provide a fastener having a plurality of diverse shaped bearing portions, one of such portions conforming substantially with the contour of the member to be supported and the other being readily deformable to retain the associated parts in assembled relation.

Other objects and advantages of the invention will be more apparent from the following description taken in connection with the accompanying drawing, in which:

Fig. 1 is a view in perspective of the front face of a panel section with a moulding strip assembled thereto by means of the fastener, parts being broken away and in section.

Fig. 2 is a view in perspective of the rear face of the assembly shown in Fig. 1.

Fig. 3 is a view in perspective of the fastener.

Fig. 4 is a perspective view of a modified form of the fastener shown in Fig. 3 and showing a fragment of the moulding.

Fig. 5 is a fragmentary view in perspective illustrating an appliance for deforming a portion of the fastener when the associated parts are assembled.

As an illustrative embodiment of the invention I have shown a panel section 10 provided with a plurality of apertures 12 which may be formed circular or otherwise. A moulding strip 14 having an arcuate outer surface 16 and inwardly bent longitudinal edges constituting flanges 18 is secured to the panel 10 by fasteners 20.

Referring particularly to Fig. 3, the fastener 20 is a one-piece, metallic construction which can be formed by a single stamping operation. It includes a head 22 having integral gripping portions 24 extending angularly from a pair of opposite sides. A pair of parallel arranged holding arms 26 are connected together and to the head 22 by a neck 28 which is disposed at right angles with respect to the head 22 and arms 26. The latter extend laterally from the neck 28 overlapping the head 22 and have their longitudinal edges 30, adjacent the base 22, angularly cut, the greatest width of the arms being adjacent the neck 28 and gradually narrowing in the direction of the free ends. In order to give greater stability to the fastener and to prevent displacement of the neck 28 when the arms 26 are spread apart, a triangularly shaped web 32 is secured to the head 22 and neck 28.

When the moulding 14 is assembled to the panel section 10 by means of the fasteners 20, the head 22 and the integral gripping portions 24 are inserted in the channel of the moulding formed by the flanges 18 and arcuate surface 16 and moved longitudinally of the moulding until they register with a respective aperture 12. The arms 26 of each fastener are then inserted through a respective aperture, as at 34 in Fig. 2, and then spread apart as shown at 36, drawing the flanges 18 of the moulding into engagement with the outer surface of the panel 10. When the particular panel is of relatively slight thickness the arms 26 can be deformed to a position approaching a straight angle with the neck 28, the surface 30 of the arms adjacent the neck 28 engaging the inner panel section. Where, however, the panel is of increased thickness, as shown at 38 in Fig. 2, deformation of the arms 26 is limited to a position shown at 40 where the surface adjacent the free ends of the arms is brought into engagement with the panel.

By the provision of arms having an angularly cut surface 30 the fastener is not limited in its use by reason of increased thickness of the panel section or the flanged portion of the moulding, but it may be used wherever it is possible to deform the arms 26 into engagement with the surface of the panel. Such a fastener has a wide field of utility in automotive vehicle body constructions.

A modified form of fastener is illustrated in Fig. 4 and includes a head 22' arcuate in cross section conforming to the contour of the associated moulding strip 14. Parallel arms 26' are arranged in overlapping relationship with respect to the head 22' and are connected thereto and with each other by an angularly disposed neck 28'. A resilient tongue 42 is struck upwardly from the head 22' and is adapted to frictionally engage the inner surface of the moulding to retain the fastener in a predetermined position.

In Fig. 5 I have shown a fragmentary portion of an appliance adapted to deform the arms 26, 26' for engagement with the surface of the panel section 10. The appliance consists of a triangularly shaped portion 44 and a rectangularly shaped portion 46, which portions may be secured to the respective jaws of a tool, such as pliers. In deforming the fastener the portion 46 is placed against the outer surface of the neck 28, 28', between the arms, and the portion 44 placed between the arms. Closing of the jaws of the pliers results in spreading the arms apart into engagement with the surface of the panel.

Various changes, including the size, shape and arrangement of parts, may be made without departing from the spirit of my invention, and it is not my intention to limit the scope thereof other than by the terms of the appended claims.

What I claim is:

1. A fastener of the class described comprising, in combination, a resilient head portion, a neck portion integrally formed with said head portion and disposed in substantially right angular relationship at one edge of said head portion, and an attaching portion integrally formed with said neck portion comprising a pair of spaced arms projecting from respective opposite edge portions of said neck portion normally overlapping said head portion and having their lower surfaces tapered in the direction of their free ends, said arms being bendable into attaching position by relative separation of the inner faces thereof into substantially the plane of the neck portion.

2. A fastener of the class described comprising, in combination, a resilient head portion, a neck portion integrally formed with said head portion and disposed in substantially right angular relationship thereto, and an attaching portion integrally formed with said neck portion comprising a pair of spaced arms projecting from respective opposite edge portions of said neck portion and bendable relative thereto, said arms and said head portion having spaced opposed faces, the distance between said opposed faces increasing in the direction of the free ends of said arms.

3. A fastener of the class described comprising, in combination, a resilient head portion, a neck portion integrally formed with said head portion and disposed in substantially right angular relationship thereto, and an attaching portion integrally formed with said neck portion comprising a pair of spaced arms projecting from respective opposite edge portions of said neck portion and bendable relative thereto, said arms and said head portion having spaced opposed faces, the faces of said arms opposed to said head portion being tapered in the direction of the free ends thereto to increase the distance between said opposed faces at spaced locations.

4. A fastener of the class described comprising, in combination, a head portion, a fixed neck portion and an attaching portion integrally formed with said neck portion and including a pair of spaced arms overlapping said head portion, said arms and said head portion having spaced opposed faces, the distance between said opposed faces increasing in the direction of the free ends of said arms, said arms being bendable relative to said neck portion into attaching position.

DAVID R. STAMY.